Oct. 26, 1971  J. W. TUMAVICUS  3,615,052
VARIABLE AREA EXHAUST NOZZLE
Filed Oct. 17, 1968  3 Sheets-Sheet 1
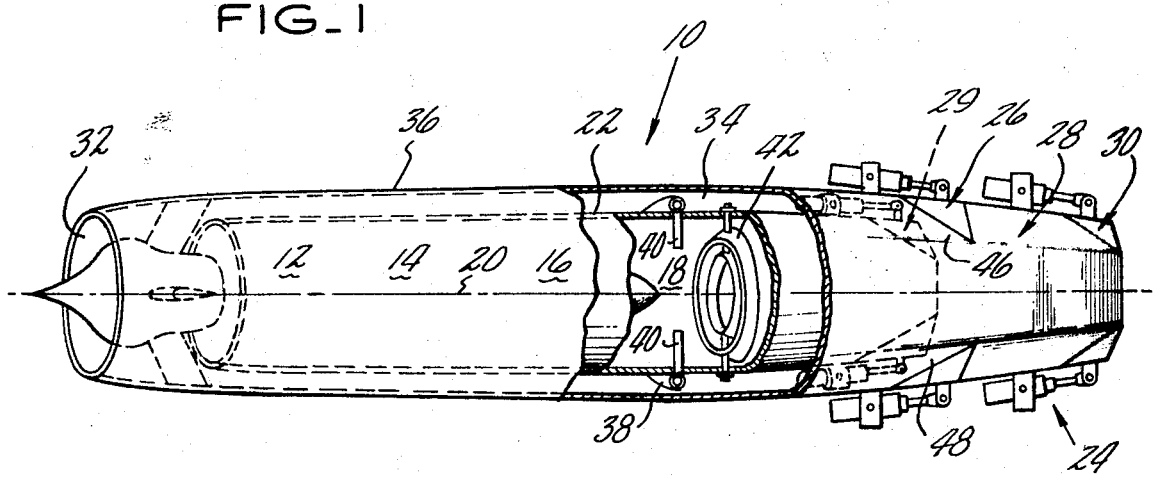
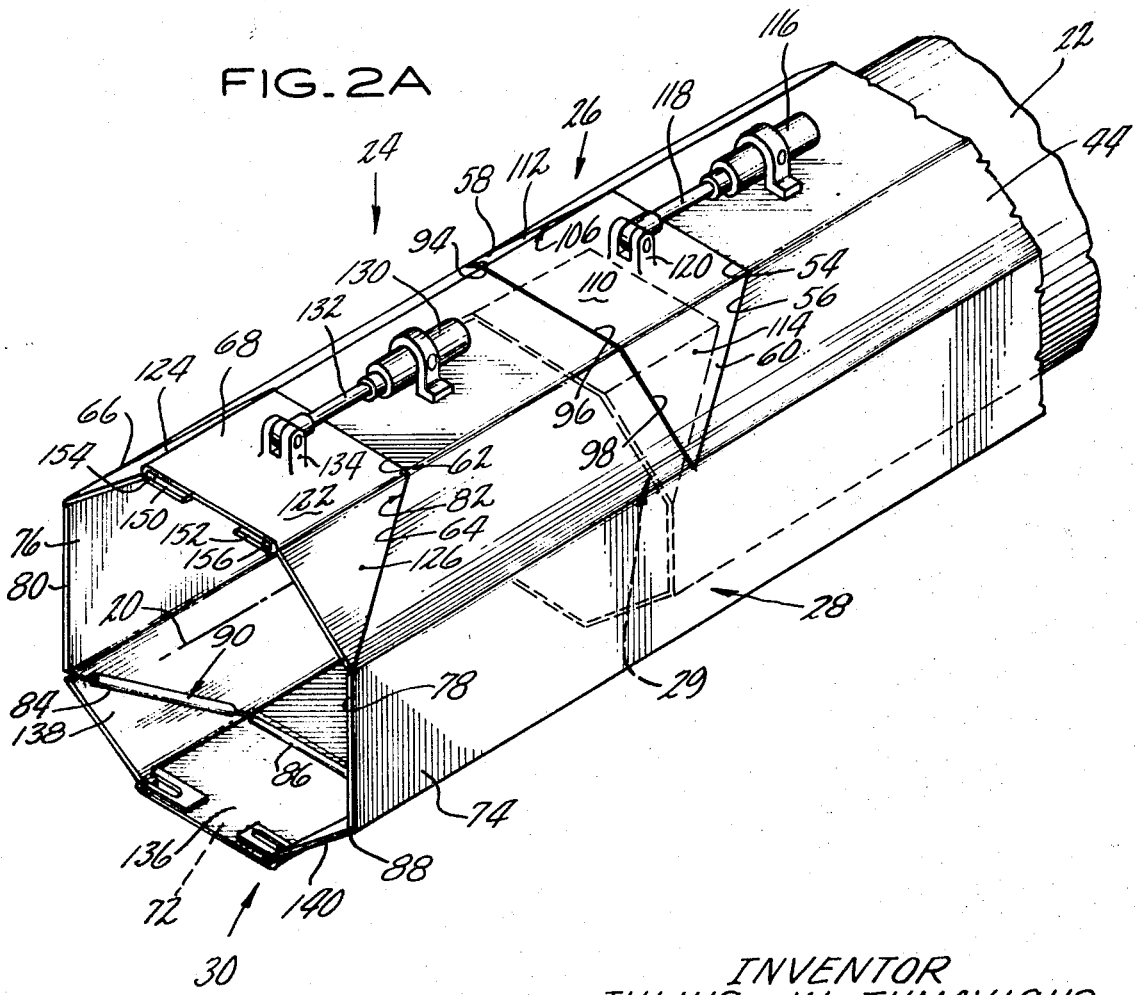
INVENTOR
JULIUS W. TUMAVICUS
BY Vernon F. Hauschild
ATTORNEY

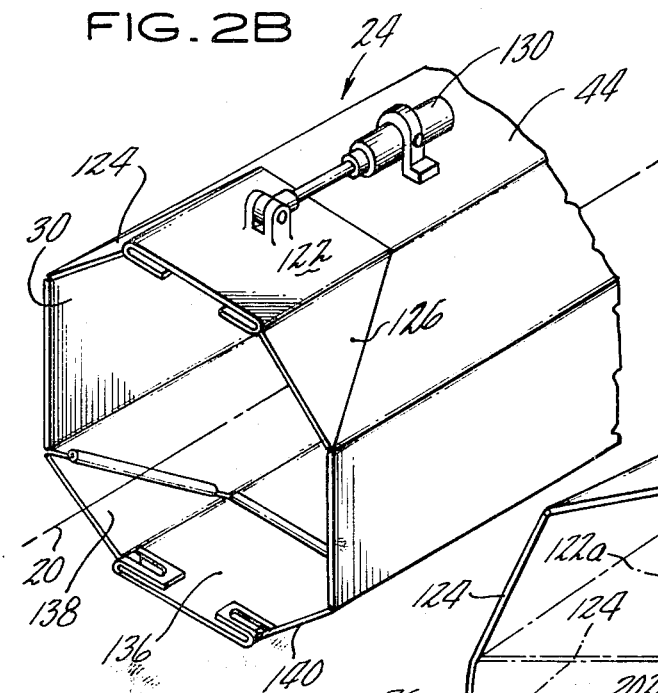
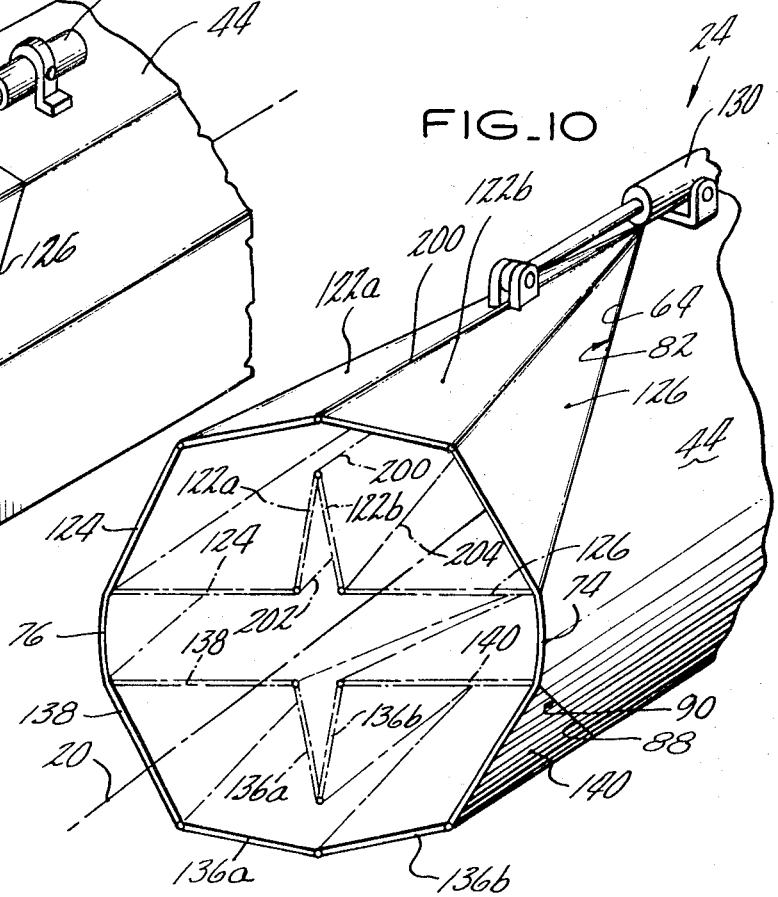
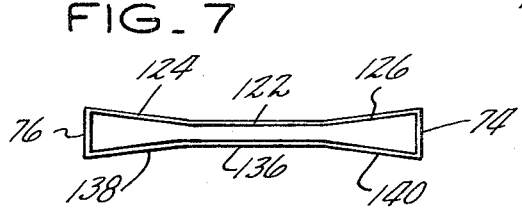
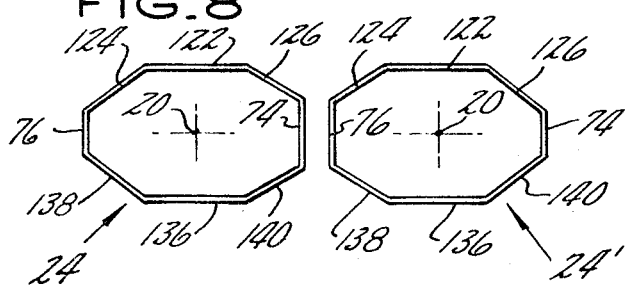
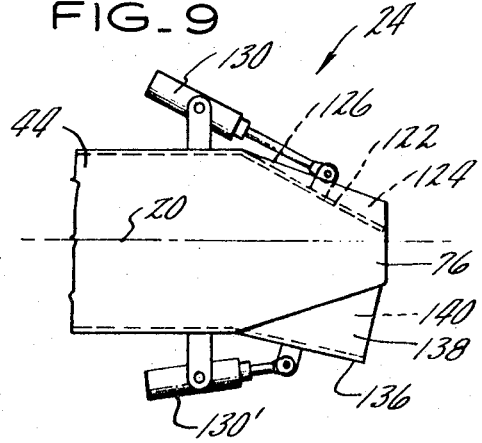

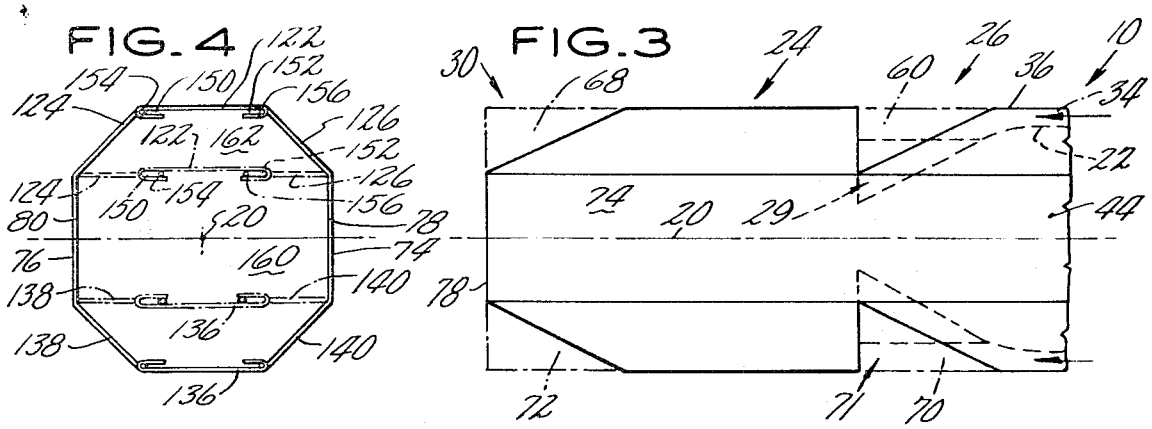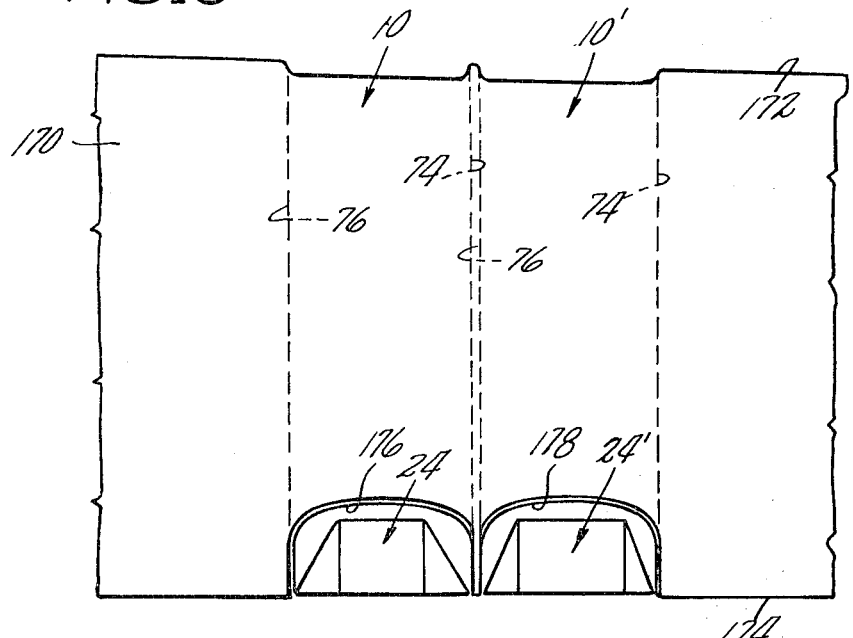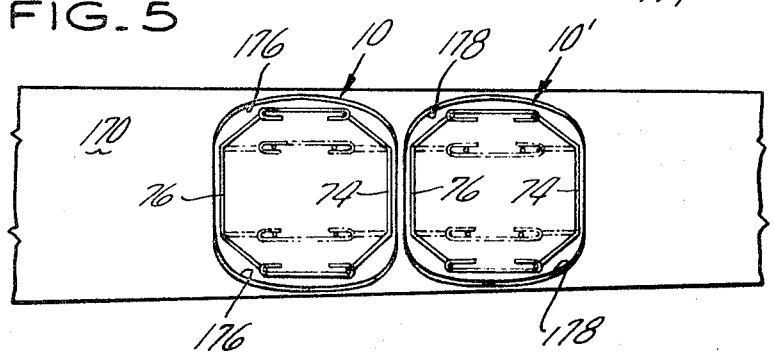

United States Patent Office 3,615,052
Patented Oct. 26, 1971

3,615,052
VARIABLE AREA EXHAUST NOZZLE
Julius W. Tumavicus, Old Saybrook, Conn., assignor to
United Aircraft Corporation, East Hartford, Conn.
Filed Oct. 17, 1968, Ser. No. 768,476
Int. Cl. B64c 15/06
U.S. Cl. 239—265.39                                    18 Claims

ABSTRACT OF THE DISCLOSURE

A variable area exhaust nozzle for a thrust generating engine which includes an exhaust duct member with fixed side walls and with a plurality of pivotable flaps attached thereto and cooperating therewith to define a high aspect ratio exhaust nozzle when the flaps are pivoted inwardly to their minimum area position and a low aspect ratio exhaust nozzle when the flaps are pivoted outwardly to their maximum area position.

BACKGROUND OF THE INVENTION

Field of the invention

This invention relates to variable area exhaust nozzles for use with thrust generating engines, such as turbine powered jet engines, and more particularly to such exhaust nozzles which are intended for use with high performance, thrust generating engines which use thrust augmentation schemes such as afterburners and also which may be used as ejector-type exhaust nozzles. In high performance, thrust augmented engines, high area ratio between the outlet which the exhaust nozzle defines in the minimum area, cruise position and in the maximum area, thrust augmented position is desired; and, since such engines are usually used in very large, multi-engine aircraft, it is highly desirable that the engines and their exhaust nozzles be clusterable so as to produce minimum base drag.

Description of the prior art

In the prior art, conventional exhaust nozzles are of generally circular cross section comprising a large number of circumferentially positioned and overlapping flaps which are actuatable between a minimum and maximum area position, however, in such an exhaust nozzle arrangement the area ratio between the minimum and maximum area positions of the nozzle is very definitely limited.

As a practical matter, area ratios much over 2.2 are not possible with current exhaust nozzles without going to additional layers of flaps with their attendant weight, sealing and warping problems. In addition, such nozzles of circular cross section do not lend themselves geometrically to engine clustering in multi-engine ships without creating substantial base drag. Such a conventional nozzle is shown in U.S. Pat. No. 3,062,003.

While the prior art teaches certain variable area exhaust nozzles which are not continuously of circular cross section, such as U.S. Pat. No. 2,546,293 which teaches an exhaust nozzle which is of circular cross section in its maximum area position and of elliptical, figure-8 or similar cross section when in its minimum area position, such a nozzle arrangement is not conducive to good engine clustering since the lateral dimension of the exhaust nozzle is substantially greater in its minimum area position than in its maximum area position and therefore, adjacent nozzles would have to be spaced apart a substantial distance to allow for this lateral expansion of the adjacent exhaust nozzles and would require movable fairings therebetween to minimize base drag.

In addition, no metal would be able to be contorted out of shape as required in U.S. Pat. No. 2,546,293 and still be able to withstand the temperature and pressure of the exhaust gases of modern, augmented jet engines.

In other segments of the prior art, variable area nozzles are taught, such as in U.S. Pat. No. 2,593,420, in which the exhaust nozzle varies from a circular shape to a noncircular shape or between two non-circular shapes, however, these exhaust nozzles do not lend themselves to engine clustering with minimum base drag since their lateral dimension also varies as the nozzle moves from its minimum to maximum area positions so that base drag creating engine spacing is required to accommodate this expansion.

SUMMARY OF THE INVENTION

A primary object of the present invention is to provide an improved variable area exhaust nozzle which is actuatable between a minimum area position wherein the exhaust nozzle defines a high aspect ratio exhaust nozzle and a maximum area position wherein the exhaust outlet defines a low aspect ratio exhaust nozzle and wherein the area ratio between the minimum area outlet and the maximum area outlet is maximum.

In accordance with the present invention, when the engine is to be used in a multi-engine aircraft with the engines clustered in side-by-side relation, the exhaust nozzle side-walls are fixed to provide immediate adjacent installation of the engines without the need for engine spacing to accommodate exhaust nozzle lateral dimension variation. Accordingly, the base drag caused by engine spacing is avoided and it is not necessary to use the movable fairing which would be required to avoid creating the base drag.

In accordance with a further aspect of the present invention, such a primary exhaust nozzle may be used with an ejector nozzle and/or augmentor tail feathers which are similarly fabricated.

It is the further object of this invention to teach such an exhaust nozzle with a minimum number of movable parts, thereby avoiding the manufacturing, assembly and interpart coordination and sealing problems attendant thereto.

In accordance with still a further aspect of the present invetion, the nozzle is actuatable between its maximum area and minimum area positions by powering a minimum number of flaps since the remaining flaps are slaved to the actuated flaps, and wherein the flaps are actuatable between their minimum and maximum area position by the same method or by the force of the engine exhaust gases acting thereagainst.

In accordance with a further aspect of the present invention, when this exhaust nozzle is used on a plurality of side-by-side clustered engines, the fixed sidewall of each nozzle is supported in position by the exhaust gas loading of the fixed walls of the adjacent nozzles.

In accordance with a still further aspect of the present invention, the exhaust nozzle taught herein lends itself to smooth fairing with aircraft fuselage and/or the wing trailing edge.

In accordance with a still further aspect of the present invention, the exhaust nozzle taught herein defines a nozzle exhaust area which has an aspect ratio (i.e., outlet width: outlet height) greater than one in the minimum area position and which has an aspect ratio of one or less in the maximum area position.

In accordance with still a further aspect of the present invention, the exhaust nozzle taught herein can be made of maximum aspect ratio in its minimum area position by diminishing the height of the fixed side walls, which also has the result of increasing the exhaust outlet area ratio between the minimum and maximum area positions of the nozzle.

In accordance with still a further aspect of the present invention, an exhaust nozzle is taught in which the exhaust outlet defining mechanism is fixed in part and movable in part and so that the fixed and movable portions cooperate to define an exhaust outlet of varying geometry and area but with fixed dimensions across the fixed portions.

In accordance with a further aspect of the present invention, the exhaust nozzle taught herein permits maximum outlet area variation with minimum flap overlapping and may be accomplished without inter-flap sealing.

It is a still further aspect of this invention that a variable area exhaust nozzle producing maximum area variation is accomplished without deforming hot gas duct defining parts.

In accordance with the further aspect of the present invention, the exhaust nozzle taught herein may have fixed walls of minimum height and may even approach zero height at the exhaust nozzle outlet so that the exhaust nozzle may serve to fully shut-off airflow through its associated engine.

It is still a further aspect of the present invention that the exhaust nozzle taught herein may be actuated to establish thrust deflection.

It is still a further aspect of this invention to teach an exhaust nozzle having fixed side walls of different height so as to produce a non-symmetric exhaust outlet and which is adapted for use with an exhaust nozzle in a compound powerplant which is allochrial therewith.

Other objects and advantages will be apparent from the specification and claims and from the accompanying drawings which illustrate an embodiment of the invention.

BRIEF DESCRIPTION OF THE DRAWINGS

FIG. 1 is a showing of a modern, thrust generating aircraft engine which includes an afterburner for thrust augmentation and which utilizes exhaust nozzle taught herein.

FIG. 2A is a perspective showing of the exhaust nozzle taught herein.

FIG. 2B corresponds to FIG. 2A but illustrates my invention in a single exhaust nozzle form.

FIG. 3 is a side view of the exhaust nozzle shown in FIG. 2A.

FIG. 4 is a rear view of the exhaust nozzle taught herein illustrating the exhaust nozzle flaps in minimum area position in phantom and in their maximum area position in solid lines and further illustrating the interconnection between the master and the slave flaps.

FIGS. 5 and 6 are a rear and plan view, respectively, of thrust engines utilizing my exhaust nozzle positioned in clustered formation in the wing of an aircraft.

FIG. 7 is a showing of an exhaust outlet defined by an exhaust nozzle of the type shown in FIGS. 2A and 2B in which the fixed side walls are of minimum height so as to permit engine shut-off when the exhaust flaps are in their minimum area, high aspect ratio position.

FIG. 8 illustrates the exhaust outlets in compound powerplants defined by adjacent exhaust nozzles of the types shown in FIGS. 2A and 2B in which the side walls of each exhaust nozzle are of different height so as to produce non-symmetric exhaust outlets, which exhaust outlets are allochrial when the respective exhaust nozzles are in the same operating positions.

FIG. 9 is a side view of our exhaust nozzle illustrating thrust deflection capability in which a first plurality of flaps are actuated toward the engine centerline while the second plurality of flaps are actuated away from the engine centerline.

FIG. 10 has a schematic showing of an exhaust nozzle of the type taught herein utilizing two pivotally connected master flaps in each flap plurality.

DESCRIPTION OF THE PREFERRED EMBODIMENT

Referring to FIG. 1 we see modern aircraft thrust generating engine 10, which may be of the type more fully disclosed and described in U.S. Pat. Nos. 3,062,003, 2,711,631, and 2,747,367 and which includes compressor section 12, burner section 14, turbine section 16, and thrust augmenting after burner section 18, all positioned along engine longitudinal axis 20 within engine case 22. Variable area exhaust nozzle 24, which is shown as of the ejector type but could be a simple exhaust nozzle as in FIG. 2B, is positioned on the rearward end or outlet of engine 10 and includes blow-in door section 26, fixed section 28, primary nozzle 29, and variable area flap section or tail feather section 30.

Air enters engine 10 through engine inlet 32 and a portion of the air passes as cooling or secondary air through passage 34 defined between engine shroud 36 and engine case 22. The remainder of the air which enters engine inlet 32 passes through compressor section 12 where it is compressed, then through burner section 14 where heat is added thereto, then through turbine section 16 where sufficient energy is extracted therefrom to drive the compressor of compressor section 12 and then passes into afterburner 18 where more energy is added thereto by the introduction of additional fuel through fuel manifold 38, which causes atomized fuel to spray into the afterburner interior through a plurality of spray bars 40. Flame holder 42 estabishes a stagnation region downstream thereof to support combustion within afterburner 18. The exhaust gases are then discharged to atmosphere through variable area exhaust nozzle 24 to perform a thrust generating function. During certain engine operating conditions, the doors of blow-in door section 26 are open to admit the entry of air into ejector type exhaust nozzle 24 for discharge to atmosphere with the engine exhaust gases. The construction and operation of the ejector type exhaust nozzle 24 is described in greater detail in U.S. Pat. No. 3,062,003.

Exhaust nozzle 24 is shown in greater particularity in FIGS. 2A and 3. For the purpose of simplicity, exhaust nozzle 24 is shown as a polygon in FIGS. 2A and 3 but it should be borne in mind that it could be of any shape, with respect to axis 20. Exhaust nozzle 24 comprises gas flow defining duct member 44, which may be a continuation of shroud 36. If duct member 44 is of circular cross section, transition sections such as 46 and 48 (see FIG. 1) are utilized in the duct member 44 to define straight or slightly curved edges for the blow-in doors and the exhaust nozzle flaps to connect to. If duct 44 is a polygon as in FIGS. 2A and 3, this is not necessary. As best shown in FIGS. 2A and 3, duct member 44 is fabricated to define straight edges 54, 56, 58, 94, 96, and 98 of the top blow-in door apertures 60 and straight edges 62, 64, and 66 of the top aperture 68 of the pivotal flap or tail feather section 30 of exhaust nozzle 24. Similarly shaped and fabricated apertures 70 and 72 are located in the opposite side of duct member 44.

With apertures 68 and 72 so defined, it will be noted that exhaust nozzle 24 at exhaust outlet 30 consists of fixed sidewalls or projections 74 and 76, which are preferably flat along the sides of engine 10 and which culminate in rear edges 78 and 80, which lie substantially in a common plane perpendicular to axis 20. Projections 74 and 76 are equidistant laterally on opposite sides of axis 20 and taper rearwardly with respect to axis 20. Straight wall edges 64, 62, and 66 cooperate to define a continuous side edge 82 of duct member apertures 68 while side edges 84, 86, and 88 of aperture 72 cooperate to define continuous side edge 90 thereof, so that side edges 82 and 90 are axisymmetric.

At exhaust outlet 30 of nozzle 24, master flap 122 is pivotally connected to portion 62 of side edge 82 of aperture 68 and slave flaps 124 and 126 are pivotally connected to portions 66 and 64 of side edge 82 and are connected to master flap 122 for actuation therewith. Flaps 122, 124, and 126 may be aerodynamically actuated, or pivotable cylinder-piston unit 130 may be utilized to actuate these flaps and include actuating rod 132 which pivotally connects to lug 134 projecting from master flap 122.

A similar master flap 136 and slave flaps 138 and 140 are pivotally connected to portions 86, 84, and 88 of side edge 90 of aperture 72, respectively.

Primary exhaust nozzle 29 is fabricated precisely as is tail feather section 30 of exhaust nozzle 24 and constitutes, in effect, the variable area outlet of engine and afterburner case 22. In certain engine installations, it may be decided to use a circular exhaust nozzle as the primary exhaust nozzle.

FIG. 2B shows this invention in which exhaust nozzle 24 is a single exhaust nozzle, as opposed to the ejector type exhaust nozzle shown in FIGS. 1 and 2A, and part numbers corresponding to those used in FIGS. 1 and 2A are shown on FIG. 2B. The single exhaust nozzle shown in 2B is precisely the same in detail as tail feather section 30 of the FIG. 2A embodiment and therefore need not be described separately.

An illustration of the manner in which slave flaps, such as 124 and 126, are connected to a master flap, such as 122, is shown in FIGS. 2A and 4 wherein master flap 122 includes lateral slots 150 and 152 in the opposite sides of its trailing edge, which slots receive pins 154 and 156, which project from slave flaps 124 and 126, respectively. Accordingly, when any of the master flaps are actuated, their corresponding slave flaps move therewith. While it is deemed preferable to use a center flap 122 as the master flap, side flaps 124 and 126 could be the master flaps; but this would probably require master flap coordination mechanism.

At blow-in door section 26, similar flap pluralities are positioned in blow-in door aperture 60 and 70. For purpose of illustration, the top flap or blow-in door plurality only is shown but it should be borne in mind that a precisely similar flap or blow-in door plurality is positioned in bottom aperture 70 and designated as flap plurality 71 in FIG. 3. The top flap or blow-in door plurality comprises master flap 110, which is pivotally connected to duct member 44 at straight edge 54 of side edge 106, and slave flaps 112 and 114, which are pivotally connected to straight edges 58 and 56 of side edge 106 of aperture 60. Side edge 106 of aperture 60 consists of sections 54, 56, and 58. Unless flaps or blow-in doors 110, 112, and 114 are aerodynamically operated, a hydraulic cylinder-piston arrangement 116 can be used to actuate master flap 110 as actuating rod 118 is caused to reciprocate by piston-cylinder arrangement 116 and thereby cause master flap 110 to pivot inwardly and outwardly due to the pivot connection between shaft 118 and lug 120 projecting from flap 110. Slave flaps 112 and 114 are connected to master flap 110 as shown in FIGS. 2A and 4. All flaps or blow-in doors illustrated herein are preferably flat, with all master flaps preferably rectangular while all slave flaps are preferably triangular.

With the construction just described, and as illustrated in FIGS. 2A and 4, the flap pluralities of both the blow-in door section 26 and the exhaust nozzle outlet sections 29 and 30 of exhaust nozzle 24 may be actuated inwardly to their FIG. 4 phantom positions wherein the flaps cooperate with the duct defining member 44 to define an outlet 160 of high aspect ratio, that is, greater than one of approximately rectangular cross section, and wherein the flaps may be actuated to their outer, solid line FIG. 4 positions to define an outlet 162, of low aspect ratio, which is, approximately equal to one or even less than one and is shown to be axisymmetric about axis 20.

As mentioned previously, one of the advantages of the exhaust nozzle taught herein is that the ratio between its high aspect ratio outlet area 160 and its low aspect ratio outlet area 162 is maximum, and this is achieved with minimum number of flaps and flap overlap. In addition, the shorter the rear edges 78 and 80 of duct member 44 are made, the greater is this area ratio and the greater is the aspect ratio of the high aspect ratio nozzle 160.

As further mentioned previously, one of the advantages of the exhaust nozzle taught herein is its susceptibility to engine clustering with minimum base drag. This is illustrated in FIGS. 5 and 6 wherein thrust generating engines 10 and 10' are positioned in aircraft wing 170, which has a leading edge 172 and a trailing edge 174. Engines 10 and 10' culminate in variable area exhaust nozzles 24 and 24', which fair with wing 170 along fairing lines 176 and 178 so as to produce minimum base drag. As best shown in FIGS. 5 and 6, adjacent flat edges 74 and 76 of engines 10 and 10' abut so as to produce no gap therebetween and the base drag attendant thereto. Adjacent walls 74 and 76 assist in supporting each other since the exhaust gas pressure of engine 10 acts against wall 74 in a direction opposite to the direction in which the exhaust gas of engine 10' acts against wall 76. In addition, because side walls 74 and 76 are fixed, there is no lateral geometry variation as the exhaust nozzles go between their FIG. 4 low aspect ratio outlet shape 162 and their FIG. 4 high aspect ratio outlet shape 160, thereby avoiding the necessity for movable fairings to smoothly fill in the gap which would be required between adjacent engines by such geometric difference to avoid base drag problems.

While the fixed walls of the exhaust nozzle are shown as the side wall in FIGS. 5 and 6, it will be obvious to those skilled in the art that there are other engine cluster arrangements wherein the fixed walls would be the top and bottom walls. In a single engine unit, the fixed walls could be either the side walls or the top and bottom walls.

While conventional interflap seals could be used between the master and slave flaps taught herein, no such seals would be needed provided that the contact line between the inner surface of the master flaps 72, 122 and the outer surface of the slave triangular flaps intersects the point formed by the intersection of the hinge box of adjacent flaps.

In certain compound powerplants, it might be desirable to operate on a portion of the total number of engines only and therefore to fully shut-off the engines which are not operating. This will avoid wind-milling and other drag creating forces which would result if the inoperative engine were not shut-off. Utilizing the exhaust nozzle taught herein, it is possible to fabricate an exhaust nozzle which is capable of being shut-off when not in use or substantially so. This is accomplished by reducing the height of the side walls 74 and 76 as best shown in FIG. 7 so that master flaps 122 and 136 are substantially in contact when in their minimum area position, thereby producing a very high aspect ratio outlet whose area is substantially zero.

In addition, the side walls 76 and 74 of the exhaust nozzles need not be the same height and, in fact, it may be desirable in certain aircraft installations, particularly in compound powerplants, to fabricate exhause nozzles 24 and 24' as best shown in FIG. 8. Considering exhaust nozzle 24 in the FIG. 8 construction, it will be noted that side wall 76 is of diminished height with respect to side wall 74 so that the outlet formed by the FIG. 8 exhaust nozzle 24 is not symmetric with respect to engine axis 20. Exhaust nozzle 24' of the FIG. 8 construction is fabricated so that fixed side wall 74 is diminished with respect to fixed side wall 76 and therefore produces a non-symmetric exhaust outlet with respect to engine axis or center line 20. For thrust generation balance, however, it is probably preferable to make the outlets of exhaust nozzles of 24 and 24' of the FIG. 8 construction allochrial.

Another feature of the exhaust nozzle taught herein is that it is capable of producing thrust deflection and this is illustrated in the FIG. 9 embodiment in which actuator 130 has caused flaps 122, 124, and 126 to pivot inwardly with respect to engine axis or center line 20, whereas corresponding actuator 130' has caused flaps 136, 138, and 140 to pivot outwardly away from engine axis or center line 20. In the FIG. 9 construction, it will be noted that with the exhaust nozzle flaps positioned as illustrated, the exhaust gases are being discharged so as to have a component downwardly with respect to axis 20 and thereby produce thrust deflection which will be of assistance in take-off and maneuvering. In the FIG. 9 construction, actuators 130 and 130' could also move the flap pluralities in the opposite direction to that illustrated so as to produce thrust deflection in the opposite direction.

Viewing the FIG. 10 construction, we see an exhaust nozzle embodiment 24 in which we have, in effect, two pivotally connected master flaps 122A and 122B, which are pivotally connected along pivot line 200 and which are actuated by actuator 130 between their FIG. 10 solid line low aspect ratio position and their FIG. 10 phantom line high aspect ratio position and carry slave flaps 124 and 126 therewith, to which they pivotally connect along pivot lines 202 and 204. A similar flap plurality including pivotally connected master flaps 136A and 136B and slave flaps 138 and 140 are positioned on the opposite sides of fixed walls 74 and 76 from the first flap plurality 122A, 122B, 124, and 126 and are pivotally connected to exhaust gas duct 44 in the same fashion. In the FIG. 10 embodiment, flaps 124, 126, 138, and 140 could be made the master flaps to produce a low aspect ratio outlet shape as that shown in FIG. 2B.

I wish it to be understood that I do not desire to be limited to the exact details of construction shown and described, for obvious modifications will occur to a person skilled in the art.

I claim:

1. A variable area exhaust nozzle for a thrust generating engine having a longitudinal axis including:
   (a) a gas flow defining duct member which is substantially axisymmetric about said axis and which has a forward end constituting a gas inlet and a rearward end constituting a gas outlet,
   (b) two projections attached to opposite sides of said duct member and projecting rearwardly therefrom and with each projection shaped to taper in a rearward direction and to cooperate with the other projection to form continuation of said duct member and so as to define rearwardly tapering fixed walls on opposite sides of said axis and terminating in rearward edges lying in a common plane perpendicular to said axis and with said projections further shaped to cooperate with said duct member to define two side edges on opposite sides of said rearward edges and each extending continuously between corresponding ends of said rearward edges and said duct member,
   (c) a plurality of flap members movably connected to said side edges and shaped and positioned so as to cooperate with said projections to define a variable area continuation of said duct member and being movable between a first position wherein said flap plurality and said projections cooperate to define a convergence duct having a high aspect ratio outlet with fixed walls on opposite sides thereof and a second position wherein said flap plurality and said projections cooperate to define an exhaust duct having a low aspect ratio outlet with fixed walls on opposite sides thereof.

2. Apparatus according to claim 1 wherein said rearward edges of said projections are of minimum height so that the area of said high aspect ratio outlet is substantially zero.

3. Apparatus according to claim 1 wherein said rearward edges of said projections are of different heights so that said low aspect ratio and high aspect ratio outlets are non-symmetric with respect to said axis.

4. Apparatus according to claim 1 wherein said duct member is of circular cross section and includes a transition section extending along said axis and shaped so that said side edges constitute a plurality of connected straight edges, and wherein the flaps of said plurality are flat.

5. Apparatus according to claim 4 wherein said projections are flat.

6. Apparatus according to claim 5 and wherein said flaps are pivotally connected to said side edges and including means to actuate said flap plurality between said positions.

7. Apparatus according to claim 6 wherein a first plurality of flaps is pivotally connected to said side edge on one side of said rearward edges of said projections and a second plurality of flaps is pivotally connected to said side edge on the opposite side of said rearward edges of said projections, and including means to actuate one of said flap pluralities toward said axis and the other of said flap pluralities away from said axis so as to establish an exhaust passage which is askew with respect to said axis and thereby produce an exhaust nozzle with thrust deflection capabilities.

8. Apparatus according to claim 7 in which each of said flap pluralities includes a center flap and slave flaps on opposite sides thereof and connected thereto so that as said actuating means actuates said master flaps, said flap pluralities are actuated between their low aspect ratio outlet positions and their high aspect outlet positions.

9. Apparatus according to claim 8 wherein each of said flap pluralities includes at least two pivotally connected master flaps and wherein said flap actuating means is connected to said pivot connection between said master flaps.

10. An ejector type variable area exhaust nozzle for a thrust generating engine having a longitudinal axis including:
   (a) a gas flow defining duct member which is substantially axisymmetric about said axis and which has a forward end constituting a gas inlet and rearward end constituting a gas outlet,
   (b) two projections attached to opposite sides of said duct member and projecting rearwardly therefrom and with each projection shaped to taper in a rearward direction and to cooperate with the other projection to form an axisymmetric continuation of said duct member and so as to define rearwardly tapering fixed walls on opposite sides of said axis and terminating in rearward edges lying in a common plane perpendicular to said axis and with said projections further shaped to cooperate with said duct member to define two axisymmetric side edges on opposite sides of said rearward edges and each extending continuously between corresponding ends of said rearward edges and said duct member,
   (c) a plurality of exhaust nozzle flap members movably connected to said side edges and shaped and positioned so as to cooperate with said projections to define a variable area continuation of said duct member and being movable between a first position wherein said flap plurality and said projections cooperate to define a convergence duct having a high aspect ratio outlet with fixed walls on opposite sides thereof and a second position wherein said flap plurality and said projections cooperate to define an exhaust duct having a low aspect ratio outlet of cross-sectional shape and area substantially the same as said duct member, and with fixed walls on opposite sides thereof,
(d) two apertures positioned in opposite walls of said duct member forward of said projections and each conforming to the shape of the duct member and each including:
 (1) a leading edge, two side edges and a rearward edge,
(e) a plurality of blow-in flaps located in each of said apertures and including:
 (1) a master flap movably connected to said leading edge and extending to said rearward edge,
 (2) at least one slave flap movably connected to each of said side edges, extending to said rearward edge and connected to said master flap for motion therewith and with said flap plurality being movable between a first position wherein said flaps close said apertures and become a portion of the wall of said duct member and a second position wherein said flaps project inwardly toward said axis from said apertures to open said apertures and define a gas flow path into said duct member.

11. An ejector type variable area exhaust nozzle for a thrust generating engine having a longitudinal axis including:
(a) a gas flow defining duct member which is substantially axisymmetric about said axis and which has a forward end constituting a gas inlet and rearward end constituting a gas outlet,
(b) two projections attached to opposite sides of said duct member and projecting rearwardly therefrom and with each projection shaped to taper in a rearward direction and to cooperate with the other projection to form an axisymmetric continuation of said duct member and so as to define rearwardly tapering fixed walls on opposite sides of said axis and terminating in rearward edges lying in a common plane perpendicular to said axis and with said projections further shaped to cooperate with said duct member to define two axisymmetric side edges on opposite sides of said rearward edges and each extending continuously between corresponding ends of said rearward edges and said duct member,
(c) a plurality of exhaust nozzle flap members movably connected to said side edges and shaped and positioned so as to cooperate with said projections to define a variable area continuation of said duct member and being movable between a first position wherein said flap plurality and said projections cooperate to define a convergence duct having a high aspect ratio outlet with fixed walls on opposite sides thereof and a second position wherein said flap plurality and said projections cooperate to define an exhaust duct having a low aspect ratio outlet of cross-sectional shape and area substantially the same as said duct member, and with fixed walls on opposite sides thereof,
(d) two apertures positioned in opposite walls of said duct member forward of said projections and each conforming to the shape of the duct member and each including:
 (1) a leading edge, two side edges and a rearward edge,
(e) a plurality of blow-in flaps located in each of said apertures and including:
 (1) a master flap movably connected to said leading edge and extending to said rearward edge,
 (2) at least one slave flap movably connected to each of said side edges, extending to said rearward edge and connected to said master flap for motion therewith and with said flap plurality being movable between a first position wherein said flaps close said apertures and a portion of the wall of said duct member and a second position wherein said flaps project inwardly toward said axis from said apertures to open said apertures and define a gas flow path into said duct member.
(f) and a variable area primary exhaust nozzle positioned within said duct member substantially in radial alignment with said blow-in flaps.

12. An ejector type variable area exhaust nozzle for a thrust generating engine having a longitudinal axis including:
(a) a first gas flow defining duct member which is substantially axisymmetric about said axis and which has a forward end constituting a gas inlet and rearward end constituting a gas outlet,
(b) two projections attached to opposite sides of side duct member and projecting rearwardly therefrom and with each projection shaped to taper in a rearward direction and to cooperate with the other projection to form an axisymmetric continuation of said duct member and so as to define rearwardly tapering fixed walls on opposite sides of said axis and terminating in rearward edges lying in a common plane perpendicular to said axis and with said projections further shaped to cooperate with said duct member to define two axisymmetric said edges on opposite sides of said rearward edges and each extending continuously between corresponding ends of said rearward edges and said duct member,
(c) a plurality of exhaust nozzle flap members movably connected to said side edges and shaped and positioned so as to cooperate with said projections to define a variable area continuation of said duct member and being movable between a first position wherein said flap plurality and said projections cooperate to define a convergence duct having a high aspect ratio outlet with fixed walls on opposite sides thereof and a second position wherein said flap plurality and said projections cooperate to define an exhaust duct having a low aspect ratio outlet of cross-sectional shape and area substantially the same as said duct member, and with fixed walls on opposite sides thereof,
(d) two apertures positioned in opposite walls of said first duct member forward of said projections and each conforming to the shape of the duct member and each including:
 (1) a leading edge, two side edges and a rearward edge,
(e) a plurality of blow-in flaps located in each of said apertures and including:
 (1) a master flap movably connected to said leading edge and extending to said rearward edge,
 (2) at least one slave flap movably connected to each of said side edges, extending to said rearward edge and connected to said master flap for motion therewith and with said flap plurality being movable between a first position wherein said flaps close said apertures and become a portion of the wall of said duct member and a second position wherein said flaps project inwardly toward said axis from said apertures to open said apertures and define a gas flow path into said duct member,
(f) a second gas flow defining duct member which is substantially axisymmetric about said axis and which has a forward end constituting a gas inlet and rearward end constituting a gas outlet, and which is enveloped within said first duct member,
(g) two projections attached to opposite sides of said second duct member and projecting rearwardly therefrom and with each projection positioned substantially in radial alignment with said blow-in door apertures and shaped to taper in a rearward direction and to cooperate with the other projection to form an axisymmetric continuation of said second duct member and so as to define rearwardly tapering fixed walls on opposite sides of said axis and terminating in rearward edges lying in a common plane perpendicular to said axis and with said projections further shaped to cooperate with said second duct member to define two axisymmetric side edges on opposite sides of said rearward edges and each extending continuously between corresponding ends of said rearward edges and said second duct member, (h) a plurality of exhaust nozzle flap members movably connected to said side edges of said second duct member and shaped and positioned so as to cooperate with said projections to define a variable area continuation of said second duct member and being movable between a first position wherein said flap plurality and said projections cooperate to define a convergence duct having a high aspect ratio outlet with fixed walls on opposite walls thereof and a second position wherein said flap plurality and said projections cooperate to define an exhaust duct having a low aspect ratio outlet of cross-sectional shape and area substantially the same as said duct member, and with fixed walls on opposite sides thereof.

13. Apparatus according to claim 10 and including means to actuate said exhaust nozzle flaps and said blow-in flaps.

14. A variable area exhaust nozzle for a thrust generating engine having a longitudinal axis including:
  (a) a gas flow defining duct member which is substantially axisymmetric about said axis and which has a forward end constituting a gas inlet and a rearward end constituting a gas outlet,
  (b) two projections attached to opposite sides of said duct member and projecting rearwardly therefrom and with each projection shaped to taper in a rearward direction and to cooperate with the other projection to form an axisymmetric continuation of said duct member and so as to define rearwardly tapering fixed walls on opposite sides of said axis and terminating in rearward edges lying in a common plane perpendicular to said axis and with said projections further shaped to cooperate with said duct member to define two axisymmetric side edges on opposite sides of said rearward edges and each constituting three joined straight edges extending continuously between corresponding ends of said rearward edges and said duct member,
  (c) a plurality of flap members pivotally connected to each of said side edges including a substantially rectangular master flap connected to the middle of said straight edges of said side edges and a substantially triangular slave flap connected to each of the remaining of said straight edges and shaped so as to cooperate with said projections to define a variable area continuation of said duct member and being movable between a first position wherein said flap plurality and said projections cooperate to define a convergence duct having a high aspect ratio outlet with fixed walls on opposite sides thereof and a second position wherein said flap plurality and said projections cooperate to define an exhaust duct having a low aspect ratio outlet of cross-sectional shape and area substantially the same as said duct member, and with fixed walls on opposite sides thereof.

15. Apparatus according to claim 14 including means to actuate said master flaps and means joining said slave flaps to said master flap for actuation therewith.

16. An ejector type variable area exhaust nozzle for a thrust generating engine having a longitudinal axis including
  (a) a gas flow defining duct member which is substantially axisymmetric about said axis and which has a forward end constituting a gas inlet and rearward end constituting a gas outlet,
  (b) two projections attached to opposite sides of said duct member and projecting rearwardly therefrom and with each projection shaped to taper in a rearward direction and to cooperate with the other projection to form an axisymmetric continuation of said duct member and so as to define rearwardly tapering fixed walls on opposite sides of said axis and terminating in rearward edges lying in a common plane perpendicular to said axis and with said projections further shaped to cooperate with said duct member to define two axisymmetric side edges on opposite sides of said rearward edges and each constituting three joined straight edges extending continuously between corresponding ends of said rearward edges and said duct member,
  (c) a plurality of flap members pivotally connected to each of said side edges including a substantially rectangular master flap connected to the middle of said straight edges of said side edges and a substantially triangular slave flap connected to each of the remaining of said straight edges and shaped so as to cooperate with said projections to define a variable area continuation of said duct member and being movable between a first position wherein said flap plurality and said projections cooperate to define a convergence duct having a high aspect ratio outlet with fixed walls on opposite sides thereof and a second position wherein said flap plurality and said projections cooperate to define an exhaust duct having a low aspect ratio outlet of cross-sectional shape and area substantially the same as said duct member, and with fixed walls on opposite sides thereof,
  (d) two apertures positioned in opposite walls of said duct member forward of said projections and each conforming to the shape of the duct member and each including:
    (1) a leading edge, two side edges and a rearward edge,
  (e) a plurality of blow-in flaps located in each of said apertures and including:
    (1) a master flap movably connected to said leading edge and extending to said rearward edge,
    (2) at least one slave flap movably connected to each of said side edges, extending to said rearward edge and connected to said master flap for motion therewith and with said flap plurality being movable between a first position wherein said flaps close said apertures and a portion of the wall of said duct member and a second position wherein said flaps project inwardly toward said axis from said apertures to open said apertures and define a gas flow path into said duct member.

17. Apparatus according to claim 16 including means to actuate said master flaps and means joining said slave flaps to said master flap for actuation therewith.

18. A variable area exhaust nozzle for a thrust generating engine having a longitudinal axis including:
  (a) a gas flow defining duct member which is substantially axisymmetric about said axis and which has a forward end constituting a gas inlet and a rearward end constituting a gas outlet,
  (b) two projections attached to opposite sides of said duct member and projecting rearwardly therefrom and with each projection shaped to taper in a rearward direction and to cooperate with the other projection to form an axisymmetric continuation of said duct member and so as to define rearwardly tapering fixed walls on opposite sides of said axis and terminating in rearward edges lying in a common plane perpendicular to said axis and with said projections further shaped to cooperate with said duct member to define two axisymmetric side edges on opposite sides of said rearward edges and each extending continuously between corresponding ends of said rearward edges and said duct member, (c) a plurality of flap members movably connected to said side edges and shaped and positioned so as to cooperate with said projections to define a variable area continuation of said duct member and being movable between a first position wherein said flap plurality and said projections cooperate to define a convergence duct having a two-dimensional outlet of substantially rectangular cross section and a second position wherein said flap plurality and said projections cooperate to define an exhaust duct having an axisymmetric outlet of cross-sectional shape and area substantially the same as said duct member.

References Cited

UNITED STATES PATENTS

| | | | |
|---|---|---|---|
| 2,546,293 | 3/1951 | Berliner | 239—265.43 |
| 2,593,420 | 4/1952 | Diehl | 239—265.43 |
| 2,974,480 | 3/1961 | Kurti | 239—265.39 |
| 3,174,582 | 3/1965 | Duthion et al. | 239—265.39 |

LLOYD L. KING, Primary Examiner

U.S. Cl. X.R.

239—265.43